(12) United States Patent
Magnin et al.

(10) Patent No.: US 6,194,499 B1
(45) Date of Patent: *Feb. 27, 2001

(54) ADHESIVE COMPOSITION FOR HOT BONDING AND A BONDING PROCESS ENABLING ITS USE

(75) Inventors: Georges Magnin, Marseilles; Jean-Marc Berthier, Lambesc; Hélène Sibois, Les Pennes Mirabeau, all of (FR)

(73) Assignee: Eurocopter, Marignane Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,630

(22) Filed: Jul. 27, 1998

(30) Foreign Application Priority Data

Jul. 29, 1997 (FR) .................................................. 97 09637

(51) Int. Cl.$^7$ ........................................................ C08K 5/41
(52) U.S. Cl. .................. 524/170; 524/104; 524/167; 524/287; 524/299; 524/359; 524/464
(58) Field of Search ..................... 524/170, 287, 524/359, 104, 167, 299, 464

(56) References Cited

U.S. PATENT DOCUMENTS

| 4,184,994 | * | 1/1980 | Mark et al. ........................... 524/611 |
| 4,405,740 | * | 9/1983 | Davies .................................. 524/299 |
| 4,421,588 | * | 12/1983 | Davies .................................. 524/299 |
| 4,421,795 | * | 12/1983 | Davies .................................. 524/299 |
| 4,431,758 | * | 2/1984 | Osada et al. ......................... 524/104 |
| 4,448,844 | * | 5/1984 | Osada et al. ......................... 524/104 |
| 4,897,307 | * | 1/1990 | Beck et al. ........................... 524/104 |
| 5,236,972 | * | 8/1993 | Reinhart ............................... 523/122 |
| 5,300,812 | | 4/1994 | Lupinski et al. ..................... 257/723 |
| 5,612,303 | * | 3/1997 | Takayanagi et al. ................. 510/174 |
| 5,888,434 | * | 3/1999 | Mahoney et al. ...................... 264/28 |

OTHER PUBLICATIONS

Hawley's Condensed Chemical Dictionary, 12$^{th}$ Edition, Van Nostrand Reinhold Co. pp. 923–1227, 1993.*

Great & Heckh's Chemical Dictionary, Fifth Edition, p. 77, 1987.*

* cited by examiner

*Primary Examiner*—Paul R. Michl
(74) *Attorney, Agent, or Firm*—Henderson & Sturm LLP

(57) ABSTRACT

The adhesive composition (34) in accordance with the invention for the hot bonding of substrates (32, 33), polymers or metals, comprises at least one polymer material, at least one plasticiser and wetting agent, and, possibly, at least one solvent, and its operating temperature is lower than the temperature at which the substrates (32, 33) degrade and lower than the melting temperature of polymer material.

Figure 1:
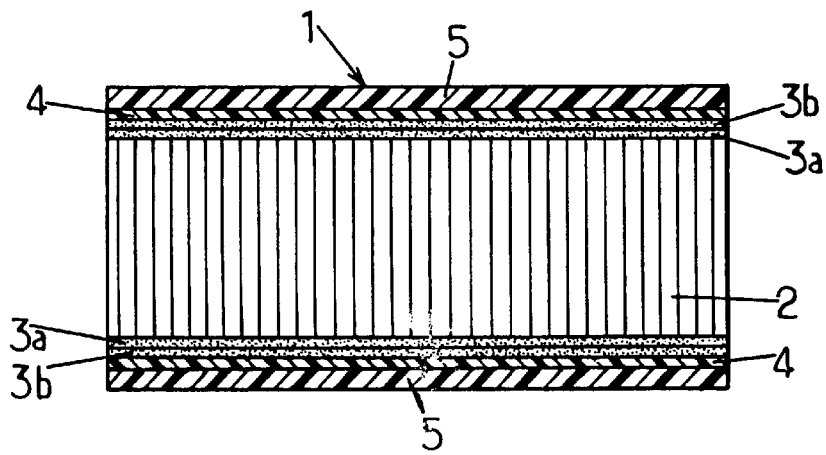

Application for making aeronautical quality sandwich structures, particularly for helicopter rotors.

12 Claims, 2 Drawing Sheets

ADHESIVE COMPOSITION FOR HOT BONDING AND A BONDING PROCESS ENABLING ITS USE

The present invention relates to an adhesive composition for the hot bonding of substrates and to a process enabling its use.

The adhesive composition of the invention enables substrates to be bonded, in particular polymer matrix composite substrates or metal substrates, for example aluminium alloy, without restricting their characteristics. It can be applied to very great advantage in the making of laminates and aeronautical quality foam or honeycomb core sandwich structures with a toughened polymer material coating, for use in rotor blades, or in mechanical parts of the rotor hub, particularly of helicopters and also for use in the interior furnishings of aircraft, public transport, etc. Such structures offer very attractive performance in terms of cost, mass, physical and mechanical characteristics.

Furthermore, the adhesive composition of the invention can be used at temperatures lower than the temperatures usually used for the bonding of toughened polymer materials, and thus gives rise to a reduction in manufacturing costs. This composition also enables the bonding of substrates of different, often incompatible, types.

Currently, in aeronautics, sandwich structures are widely used on account of their performance/mass saving ratio. Their development is however limited by their temperature performance which is difficult to improve without an increase in structure mass.

Indeed, for reasons of technical knowledge, sandwich structures are constituted, for the coating, by composite materials with an epoxy thermosetting matrix which is possibly auto-adhesive and, for the core, by honeycomb of the aromatic polyamide sheet type such as polyaramide marketed under the NOMEX® brand or metal sheets assembled with phenolic or polyimide resins. It would be very advantageous to replace the possibly auto-adhesive epoxy matrices by other modified epoxy matrices, bismaleimides (BMI) or thermoplastics such as polyetheretherketone (PEEK) or polyetherimide (PEI). Indeed, this would enable an improvement in durability at higher operating temperatures and in certain types of performance, for example damage tolerance and fire resistance.

However, to obtain good adhesion to the honeycomb core, such a modification would require:
  a significant supply of adhesive,
  an adhesive appropriate to the coating,
  the use of another honeycomb with temperature limits compatible with those of the bonding agents,
which would entail a considerable increase in costs and/or in mass.

Furthermore, it is also advantageous to be able to make materials constituted by the assembling of substrates with a thermosetting or thermoplastic matrix.

Currently, thermoplastic matrix composites can be assembled:
  by standard bonding with a thermosetting adhesive,
  or by local melting of the matrix, which enables the two substrates to weld together.

However, these two processes have two types of limitation. On the one hand, with regard to mechanical strength which is directly affected by the compatibility of the matrices of substrates and the films of adhesive and by the surface treatment. For example, making honeycomb core sandwich structures of the aramid/phenol type and with a bismaleimide matrix coating (BMI) is not possible with these processes on account of the chemical incompatibility of BMI with the core materials. And on the other hand, the temperature required to ensure the co-consolidation of interfaces is difficult to control and may give rise to deformations in neighbouring areas. Thus, it is difficult to make sandwich structures with a polyetheretherketone (PEEK) coating and with an aramid/phenol honeycomb core given that the melting temperature of the PEEK is 400° C., a temperature which honeycombs cannot resist.

So as to minimise these drawbacks, a process also called Thermabond is used. This process is both a bonding, since another resin film is added, and a co-consolidation since this film is taken to its melting temperature. For example, if it is required to assemble a PEEK matrix substrate with a PEI matrix substrate, a PEI film is interposed and the whole is heated to a temperature of about 300° C. which ensures the melting of the PEI. This high temperature is not appropriate for the making of all the substrates that it might be required to use. In particular, it is not appropriate for the making of honeycomb core sandwich structures of the aramid/phenol type.

There is therefore a pressing need for an adhesive composition appropriate for the manufacture of laminate materials which does not reduce the performance of the resulting laminate materials during use and which can be used at a temperature which is not economically prohibitive and which is also low enough to ensure that the substrates to be bonded do not deteriorate.

It is to the credit of the inventors that they have found a composition for the hot bonding of substrates comprising:
  at least one polymer material,
  at least one plasticiser and wetting agent,
  and possibly at least one solvent, characterised in that it provides an operating temperature lower than the temperature at which the substrates degrade and lower than the melting temperature of the polymer material.

The preferred temperature for using the adhesive composition of the invention is lower than the temperature at which the substrates deform and lower than the melting temperature of the polymer material.

Thus the use of the composition of the invention enables substrate structures to be obtained which have lost none of their mechanical characteristics during assembly and for which the adhesive composition does not constitute a factor limiting their possible uses.

This operating temperature is clearly a function of the nature of the substrates to be bonded and of the polymer material of the adhesive composition. It is between 50 and 250° C., preferably between 70 and 240° C. and even more preferentially between 100 and 200° C.

The polymer material of this adhesive composition comprises at least one polymer or copolymer having different or identical repetitive patterns with the general formula —Ar—X— in which:
Ar is a mono- or polycyclic substituted or non-substituted aromatic radical,
and X is an atom of nitrogen, oxygen or sulphur or an OCO, O—CO—O, CO, NHCO, N(CO$_2$), SO$_2$, O—SO$_2$, N(SO$_2$), C=NH function or a saturated or unsaturated alkyl group bearing an atom of nitrogen, oxygen or sulphur or an OCO, O—CO—O, CO, NHCO, N(CO$_2$), SO$_2$, O—SO$_2$, N(SO$_2$), C=NH function This polymer is selected as a function of the nature of the substrates to be assembled. This polymer should preferably have a chemical structure close to that of the substrate when the latter is a polymer substrate.

Examples of polymer material that can be mentioned for use in the composition of the invention, are polyetherimides (PEI), polyethersulphones, polyimides, polysulphones, polyphenylene sulphides, polyarylene oxides, aromatic polyamides, polyamideimides, aromatic polyesters, aromatic polycarbons, polyethetetherketones (PEEK).

The preferred polymer material is a polyetherimide (PEI).

The plasticiser and wetting agent is an aromatic compound bearing at least one functional group selected from ketones, such as propiophenone, benzophenone, from sulphones, such as diphenylsulphone, ditolysulphone, from esters such as phenyl benzoate or benzyl benzoate and from alcohols such as phenol.

By plasticiser and wetting agent is understood any material capable of lowering the melting temperature, the glass transition temperature and the viscosity of a polymer and of facilitating wettability, by reversible transformation of the polymer. This plasticiser and wetting agent presents a boiling or melting point comparable to that of the polymer material of the adhesive composition.

This plasticiser may be volatile at the temperature at which the adhesive composition is used or else may not be volatile at this temperature, in which case clearly it must be selected so as not to adversely affect the characteristics of the formed assembly in which it subsists.

The possible solvent is selected from chlorinated solvents such as dichloromethane and amino-solvents such as N-methylpyrrolidone.

In the present invention the term solvent and the term diluent are used without distinction. Indeed, the said solvent is used to dissolve the polymer material of the adhesive composition. It may sometimes be necessary to reduce the viscosity of this composition, particularly so as to facilitate its application to one at least of the substrates to be bonded, for example by spraying with a gun. In this case a diluent is used which is preferably surplus solvent from the composition.

In a preferred version of the invention, the composition comprises:
  from 1 to 90%, preferably from 1 to 40% and even more preferentially from 5 to 20% by weight of polymer material,
  from 1 to 40%, preferably from 1 to 10% and even more preferentially from 2 to 4% by weight of plasticiser and wetting agent,
  from 0 to 98%, preferably from 10 to 85%, and even more preferentially from 30 to 80% by weight of solvent,
  the percentages being calculated in relation to the total weight of the composition.

Clearly, the viscosity of the said composition varies from liquid form to solid form in accordance with the quantity of solvent used. It may appear in the form of solution, dispersion, suspension, film or dough. In particular, when the composition does not include any solvent, it is found in film form.

In a much preferred version the adhesive composition of the invention comprises:
  from 10 to 20% by weight of polyetherimide,
  from 2 to 5% by weight of plasticiser,
  from 86 to 77% by weight of solvent.

It is also to the credit of the inventors that they have found that the composition of the invention could be used with the aid of a process which is straightforward and easy to develop industrially.

The process of the invention is a process of hot bonding of substrates according to which:
  a layer of adhesive composition is applied to at least one surface of at least one of the substrates to be bonded,
  possibly, a layer of adhesive is applied to at least one layer of adhesive composition,
  the surfaces of the substrates to be bonded are brought into contact,
  the whole is heated, possibly under pressure, at a temperature lower than the temperature at which the substrates degrade and lower than the melting temperature of the polymer material of the said adhesive composition,
  possibly, it is cooled.

The preferred heating temperature is lower than the temperature at which the substrates deform and lower than the melting temperature of the polymer material of the adhesive composition.

This temperature is clearly a function of the substrates to be bonded and of the polymer material of the adhesive composition. It is generally between 50 and 250° C., preferably between 70 and 240° C. and even more preferentially between 100 and 200° C.

This heating stage may be carried out wholly or partly under pressure. Or else, pressure may be exerted on this assembly before or after the heating stage. This pressure is between 0.07 and 0.3 MPa, preferably between 0.10 and 0.3 MPa, and even more preferentially between 0.15 and 0.2 MPa.

In one particular version of the process of the invention, a layer of adhesive is applied to at least one layer of adhesive composition. This adhesive may be an adhesive in standard use, of the epoxy type. The adhesive composition then enables an improved distribution of the adhesive over the whole surface of the substrate to be bonded.

The process of the invention may include a stage of at least partial drying of the adhesive layer immediately after its application. Thus, the layer of adhesive composition can be dried at least partially at a temperature of between 60 and 120° C.

The adhesive composition and the bonding process enabling its use are entirely appropriate for the bonding of metal substrates, such as a substrate of aluminium alloy, thermoplastic or thermosetting polymer substrates, possibly toughened with particles or mineral or organic fibres, and of a compact, foam or cellular type structure, or laminates comprising one or more layers of metallic materials, thermoplastic or thermosetting polymers, possibly toughened with particles or mineral or organic fibres, of a compact type structure, and with a monolithic, cellular or honeycomb coating.

Examples of metal substrates that can be mentioned are aluminium and its alloys, stainless steel, metal core honeycombs, these substrates being anticorrosion treated.

The polymer substrates have the advantage of being possibly toughened polymers or copolymers, with different or identical repetitive patterns with the general formula:

—Ar—X— in which:
  Ar is a mono- or polycyclic substituted or non-substituted aromatic radical;
  and X is an atom of nitrogen, oxygen or sulphur or an OCO, O—CO—O, CO, NHCO, N(CO$_2$), SO$_2$, O—SO$_2$, N(SO$_2$), C=NH function or a saturated or unsaturated alkyl group bearing an atom of nitrogen, oxygen or sulphur or an OCO, O—CO—O, CO, NHCO, N(CO$_2$), SO$_2$, O—SO$_2$, N(SO$_2$), C=NH function Examples of these polymer materials that can be mentioned are cyanate-ester, bismaleimide, modified or non-modified epoxy thermosetting resins, possibly toughened, thermoplastic resins, possibly toughened, based on polysulphone, polyphenylene sulphide, polyetheretherketone, polyethersulphone, polyarylene oxide, polyarylene sulphides, aromatic polyamides, aromatic polyester, aromatic polycarbonate, polyetherimide and composites of the phenolic or polyamide resin type toughened with aramid or glass or carbon, the fabric being formed from glass or carbon fibres, particularly impregnated with thermoplastic resin or from Schnappe fibres.

Clearly the process of the invention may comprise a cleaning and drying stage for the substrates before the application of the adhesive composition.

The mode of application of the adhesive composition is clearly a function of the form and viscosity of the adhesive composition. This application may be made by spraying, dipping, application of the composition by brush when the composition is liquid or by deposit when the latter is in film or dough form. The process of the invention is entirely appropriate for the making of honeycomb core sandwich structures of the type with aramid or metal sheets and phenolic or polyimide binder agents and with a polyetheretherketone matrix coating coated with polyetherimide, characterised in that:

a layer of adhesive composition, as defined above, is applied to the honeycomb surfaces to be bonded and to the surface of the polyetherimide covering the polyetheretherketone coating, the surfaces coated with adhesive composition are brought into contact, the whole is heated to a temperature between 70 and 240° C., the assembly thus obtained is cooled to ambient temperature.

Figure 2:
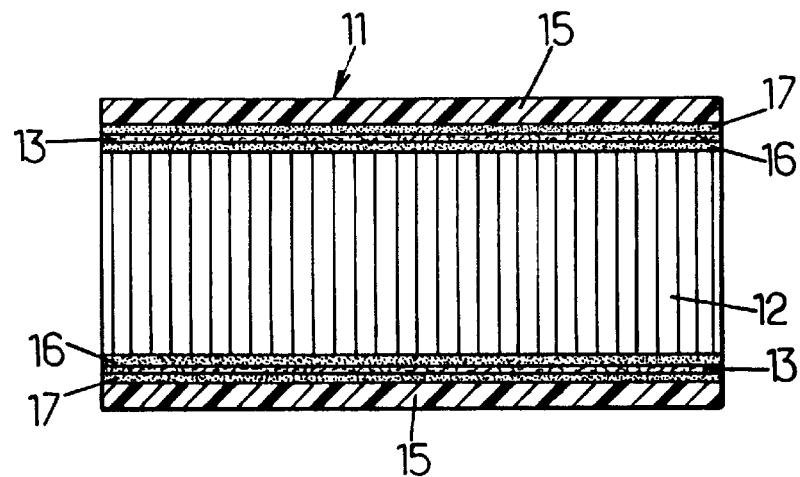
Figure 3:
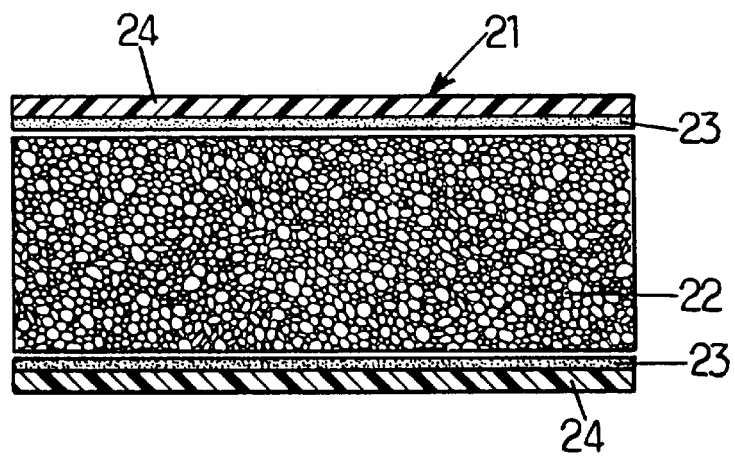
Figure 4:
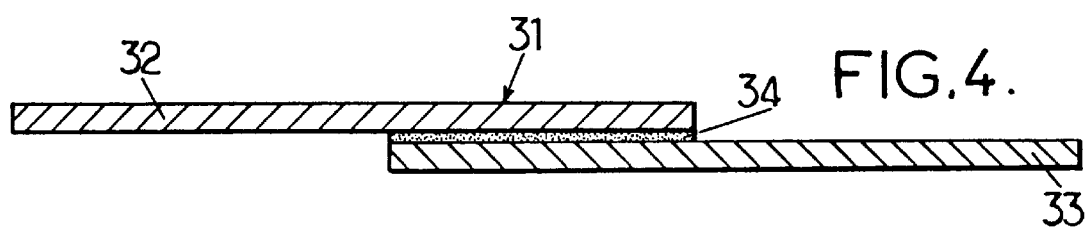
Figure 5:
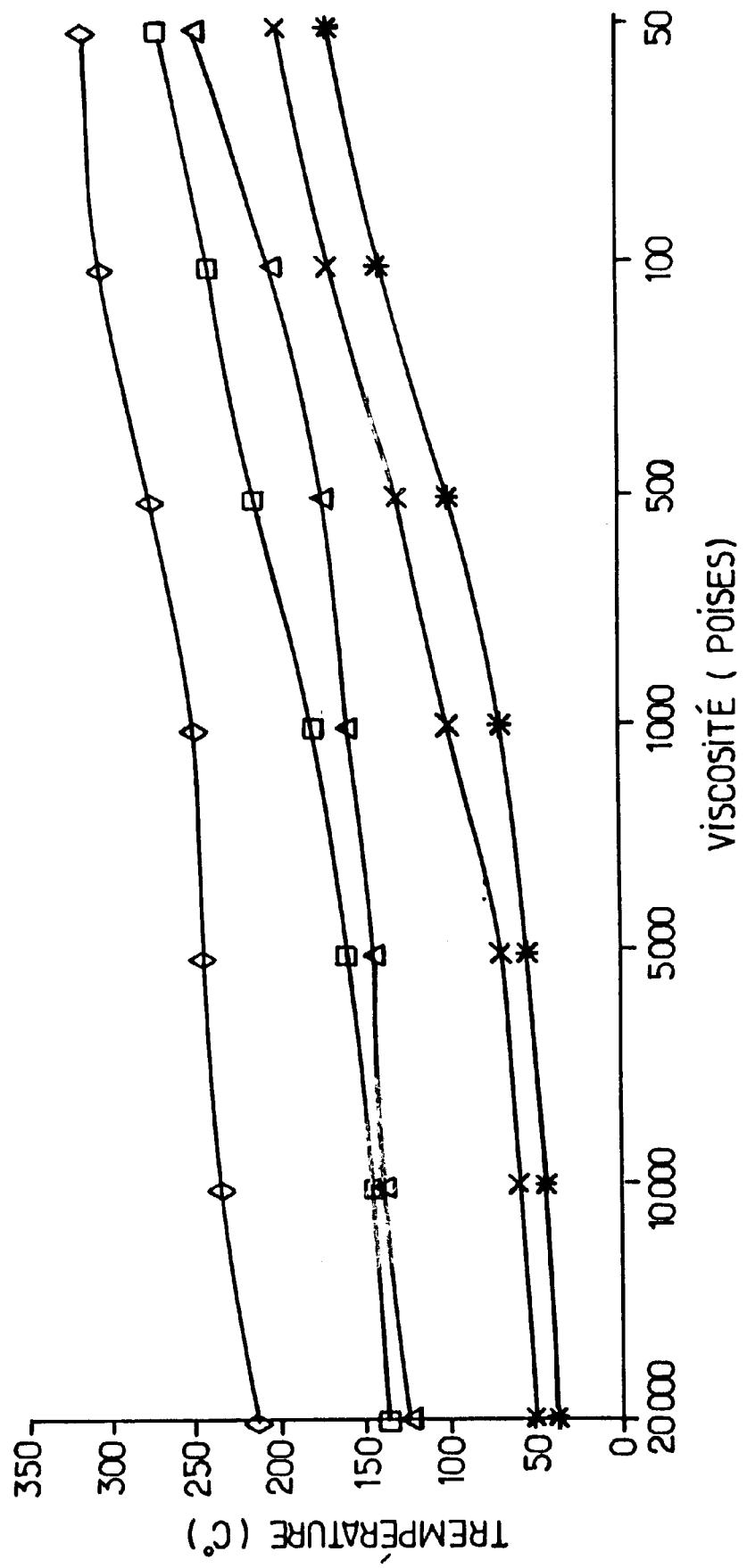

The invention is illustrated in FIGS. 1 to 5 below in which:

FIG. 1 shows in transverse section a honeycomb core sandwich structure made through implementing the process of the invention, FIG. 2 shows in transverse section another honeycomb core sandwich structure made through implementing another version of the process of the invention., FIG. 3 shows in transverse section a polyetherimide foam core sandwich structure made through implementing the process in compliance with the invention, FIG. 4 shows in transverse section a monolithic structure made through implementing the process in compliance with the invention, FIG. 5 is a graph showing the operating temperature as a function of the viscosity of the composition for four adhesive compositions as in the invention and for polyetherimide alone.

FIG. 1 shows a sandwich structure 1 with a NOMEX® sheet honeycomb core 2 and a phenolic binder agent. On each of the surfaces of this honeycomb 2 is deposited a layer of adhesive composition 3a in accordance with the invention. With each of these layers of adhesive composition comes into contact another layer 3b of this composition, coating a layer of polyetherimide 4, itself fixed to a layer 5 of polyetheretherketone toughened with carbon fibres, and constituting a skin or coating.

For the layer 5 of polyetheretherketone it is also possible to use a fabric of threads impregnated with polyetheretherketone resin or a fabric of Schnappe fibres, in which case, it is necessary to interpose between the layer 5 and the layer 4 of polyetherimide a glass haze so that the layer 4 of polyetherimide is of more or less consistent thickness. This type of substrate forming the layer 5 has the advantage of being easy to drape and to deform and therefore adapts to open-ended and/or complex forms.

FIG. 2 shows another sandwich structure 11 with a honeycomb core 12 of the NOMEX® aramid sheet type and a phenolic binder agent. On 30 each face of this honeycomb is deposited a layer 16 of adhesive composition according to the invention. On each of these layers 16 of adhesive composition is deposited a layer 13 of adhesive. With each of these layers 13 of adhesive comes into contact a layer 17 of adhesive composition on a bismaleimide matrix coating 15. The layer 13 of adhesive is optional as is the layer 17 of adhesive composition which can be provided even in the absence of the layer of adhesive 13.

The adhesive composition used in the making of the structures in FIGS. 1 and 2, as well as those in FIGS. 3 and 4 described below, have polyetherimide as the polymer material.

FIG. 3 shows a sandwich structure 21 with a polyetherimide foam core 22 and also polyetherimide matrix coatings 24. On each polyetherimide matrix coating 24 is deposited a layer 23 of adhesive composition of the invention for bonding to the core 22.

The adhesive composition of the invention in this case enables the polyetherimide matrix coatings to be bonded without the foam being compressed.

Indeed, the temperature at which the adhesive composition of the invention is used is lower than the temperature at which polyetherimide is used on its own. If the polyetherimide had been applied on its own, the foam would have been compressed since it does not withstand the temperature at which the polyetherimide is used on its own which is about 300° C.

The advantage of the adhesive composition of the invention is therefore that it increases the field of application of these sandwich structures by the use of coating or external layers at a high performance level (temperature, resistance characteristics) without affecting the initial mass.

FIG. 4 shows a monolithic structure 31 including a substrate 32 and a substrate 33 partly overlapping. Between these two substrates, on their overlapping part, is deposited a layer 34 of adhesive composition as in the invention.

In this type of structure, the substrate 32 and the substrate 33 may be of a like nature or a different nature, for example:

in composite with a polyetheretherketone matrix surface coated with a polyetherimide film, in composite with a polyetherimide matrix, in composite with a thermosetting matrix of the epoxy or bismaleimide type, or in aluminium alloy.

In order for the structures shown on FIGS. 1 to 4 described above to be permanently assembled pressure of about 0.1 to 0.3 MPa is applied for a few minutes, and, simultaneously, the structures are heated, the temperature rise cycle being of approximately equal duration to that of the pressurisation. The pressurisation can be achieved by means of a press or an autoclave.

The present invention is further illustrated by the following non-restrictive examples:

EXAMPLE 1

Adhesive compositions complying with the invention are prepared by mixing at ambient temperature:

polyetherimide,
benzophenone,
dichloromethane,
in the proportions indicated in table 1 below. These proportions are in percentage by weight in relation to the total weight of the composition.

For each of these compositions, the viscosity of the reactive agents after evaporation of the solvent was measured by means of a device of the viscoelastimeter type as a function of the temperature and the curves obtained have been traced on FIG. 5.

By way of comparison, the (reference) temperature curve has been traced as a function of the viscosity of the polyetherimide on its own. This curve is also shown on FIG. 5.

TABLE 1

|  | Composition 1 | Composition 2 | Composition 3 | Composition 4 | Reference |
|---|---|---|---|---|---|
| polyetherimide | 18 | 16 | 14 | 12 | 20 |
| Plasticiser | 2 | 4 | 6 | 8 | 1 |
| Solvent | 80 | 80 | 80 | 80 | 80 |
| Symbol used for the curve in FIG. 5 | ⅙ | ◆ | □ | ◆ | ◆ |

The temperature at which the compositions of the invention are used is therefore always lower than the temperature at which polyetherimide is used on its own.

EXAMPLE 2

Preparation of a sandwich structure with an aramid/phenolic honeycomb core.

a) Preparation of the adhesive composition:

In 200 g of dichloromethane were dissolved 25±1 g of polyethimide of grade 1000 marketed by General Electric and 5.5±0.25 g of benzophenone.

b) Treatment of honeycomb:

The honeycomb of the NOMEX® aramid sheet type with phenolic binder agent is oven dried for 1 h. 30 min at 180° C.

By means of a 2.5 mm injector gun, the adhesive composition prepared in a) above is applied.

The quantity of adhesive composition is 140 g/m²±15 (dried quantity, i.e. when the dichloromethane is completely evaporated).

c) Treatment of coatings:

The coatings to be bonded onto the core are polyeretherketone matrix coatings toughened with carbon, covered with a polyetherimide skin.

Prior stage in the assembly of the polyetherimide skin:

The polyetherimide skin is applied to the coating by compaction. To do this, the polyetherimide coating/layer assembly is placed between two KAPTON® type demoulding films previously treated with Freekote 44 NC mould release agent which is dried for 15 minutes at 150° C.

Compaction is then obtained in an autoclave or with a press.

If it is obtained in an autoclave, the polyetherimide coating/layer assembly placed between the two demoulding films is set between two plates and inserted into a vacuum pocket placed in the autoclave. In the autoclave the temperature is 390° C.±5° C. and there is negative pressure of 0.08MPa and pressure of 0.2 MPa.

If it is obtained with a press, the polyetherimide coating/layer assembly placed between the two demoulding films is set between the two plates of a press and is subjected for 35 mins±5 mins to a temperature of 390° C.±5° C. and pressure of 0.2MPa.

Preparation of the polyetherimide skin so fixed to the coating:

The polyetherimide skin is degreased by isopropyl alcohol or ASTM essence G.

With a 2.5 mm injector gun, the adhesive composition prepared in a) above is applied onto this degreased skin.

The quantity of adhesive composition is 35 g/m²±5 (dried quantity, i.e. when the dichloromethane is completely evaporated).

d) bonding of coatings:

Coatings are applied to the honeycomb core, the faces covered with adhesive composition being in contact with each other.

This assembly is taken to a temperature of 225±5° C. at 0.2 MPa for 20 minutes.

A sandwich structure is then obtained as shown in FIG. 1.

The coated pairs of this structure were measured with an INSTROM testing machine. The coated pairs in question were more than 50mm N/mm.

EXAMPLE 3

Example 2 is restarted, except that the bonding stage d) is carried out in an autoclave at a temperature of 225° C. at 0.08 MPa of negative pressure and 0.2 MPa of pressure, for a period of about 30 mins.

EXAMPLE 4

An adhesive composition as in the invention was prepared by mixing at ambient temperature:
25 g of polyetherimide,
10 g of benzophone as a plasticiser and wetting agent,
200 g of dichloromethane as solvent.

This composition was applied by gun to a NOMEX® honeycomb core at the rate of 140 g/m².

Micrographic cross-sections of the honeycomb cells show a meniscus of adhesive composition and a positive honeycomb/adhesive composition contact angle, demonstrating good wettability of the adhesive composition.

The surface tensions of the NOMEX® honeycomb and of the adhesive composition were measured by a Cahn balance and gave the following values:

V (honeycomb)=$37.6 \times 10^{-3}$ N/m and

V (primer)=$31.09 \times 10^{-3}$ N/m.

This method consists in measuring the F force that has to be exerted vertically on a sheet of glass or on a material to balance the surface attraction forces.

When the sheet of glass is brought into contact with the surface of the liquid, the latter tends to wet the surface of the sheet. The Cahn balance measures the pulling force required to remove the test tube from the liquid to be analysed.

For the liquid to properly wet the solid, the tension of the former must be lower than the tension of the latter. The liquid will then be able to run along the walls and form a low connection angle.

The wettability of the adhesive composition for epoxy matrix composites at high temperature and for polyamide resins is equally satisfactory.

What is claimed is:

1. An adhesive composition for the hot bonding of substrates consisting of:

at least one polymer material in the form of a polyetherimide;

at least one plasticiser;

wherein the said plasticiser is an aromatic compound selected from the group consisting of propiophenone, benzophenone, diphenylsulphone, ditolylsulphone, phenyl benzoate, benzyl benzoate and phenol.

2. An adhesive composition for the hot bonding of substrates consisting of:
- at least one polymer material in the form of a polyetherimide;
- at least one plasticiser;
  wherein the said plasticiser is an aromatic compound selected from the group consisting of propiophenone, benzophenone, diphenylsulphone, ditolylsulphone, phenyl benzoate, benzyl benzoate and phenol,
- and at least one solvent.

3. A composition according to claim 2, wherein the solvent is selected from the group consisting of chlorinated solvents and amino-solvents.

4. A composition according to claim 3, wherein the chlorinated solvent is dichloromethane and the amino-solvent is N-methylpyrrolidone.

5. A composition according to claim 2, wherein the said composition includes:
- from 1 to 90% by weight of polymer material,
- from 1 to 40% by weight of plasticiser,
- from 10 to 98% by weight of solvent.

6. A composition according to claim 2, wherein the said composition includes:
- from 1 to 40% by weight of polymer material,
- from 1 to 10% by weight of plasticiser,
- from 10 to 85% by weight of solvent.

7. A composition according to claim 2, wherein the said composition includes:
- from 5 to 20% by weight of polymer material,
- from 2 to 4% by weight of plasticiser,
- from 30 to 80% by weight of solvent.

8. A composition according to claim 2, wherein the said composition includes:
- from 5 to 20% by weight of polymer material,
- from 2 to 4% by weight of plasticiser,
- from 30 to 80% by weight of solvent.

9. A composition according to claim 1, wherein it is presented in the form a solution, dispersion, suspension, film or dough.

10. A composition according to claim 2, wherein it is presented in the form a solution, dispersion, suspension, film or dough.

11. A composition according to claim 1, wherein it is presented in the form of a film including at least one polymer material and at least one plasticiser.

12. A composition according to claim 2, wherein it is presented in the form of a film including at least one polymer material and at least one plasticiser.

* * * * *